US008849592B2

(12) United States Patent
Takashima

(10) Patent No.: US 8,849,592 B2
(45) Date of Patent: Sep. 30, 2014

(54) FUEL-INJECTION CONDITION DETECTOR

(75) Inventor: Yoshimitsu Takashima, Anjo (JP)

(73) Assignee: Denso Corporation, Kariya (JP)

( * ) Notice: Subject to any disclaimer, the term of this patent is extended or adjusted under 35 U.S.C. 154(b) by 217 days.

(21) Appl. No.: 13/214,402

(22) Filed: Aug. 22, 2011

(65) Prior Publication Data

US 2012/0072134 A1 Mar. 22, 2012

(30) Foreign Application Priority Data

Sep. 17, 2010 (JP) ................................ 2010-209100

(51) Int. Cl.
*G01F 23/14* (2006.01)
*F02D 41/38* (2006.01)

(52) U.S. Cl.
CPC ........ *F02D 41/3863* (2013.01); *F02D 2250/04* (2013.01); *F02D 2200/0604* (2013.01); *F02D 2200/0602* (2013.01)
USPC .......................................................... 702/50

(58) Field of Classification Search
CPC ....................................................... G01F 23/14
USPC ......... 702/45, 47, 50, 98, 100, 127, 138, 183, 702/185, 189
See application file for complete search history.

(56) References Cited

U.S. PATENT DOCUMENTS

| | | | | |
|---|---|---|---|---|
| 4,311,043 | A * | 1/1982 | Reid et al. | 73/114.51 |
| 2010/0250095 | A1 | 9/2010 | Yamada et al. | 701/103 |
| 2010/0250096 | A1 | 9/2010 | Yamada et al. | 701/103 |

FOREIGN PATENT DOCUMENTS

| | | |
|---|---|---|
| JP | 2000-27689 | 1/2000 |
| JP | 2006-168628 | 6/2006 |
| JP | 2008-2848 | 1/2008 |
| JP | 2009-9331 | 1/2009 |
| JP | 974283 | 5/2009 |
| JP | 2010-40553 | 2/2010 |
| JP | 2010-207035 | 9/2010 |

OTHER PUBLICATIONS

Chinese Office Action issued for Chinese Patent Application No. 201110287313.6, dated Nov. 5, 2013

* cited by examiner

*Primary Examiner* — Mohamed Charioui
(74) *Attorney, Agent, or Firm* — Nixon & Vanderhye P.C.

(57) ABSTRACT

A fuel-injection condition detector includes a first approximate portion which approximates a plurality of fuel pressure values representing the descent pressure waveform or the ascent pressure waveform into a least-squares approximate line by least-squares method; and a weighting portion which applies a weight to the fuel pressure value. The weight is set greater as a difference between the fuel pressure and the least-squares approximate line is larger. Then, the weighted values are approximated into a weighted approximate line by the least-squares method.

2 Claims, 5 Drawing Sheets

INJECTION-COMMAND SIGNAL
t1
Tq
t2

INJECTION-RATE
R2
R3
R1
Rα
Rh
Rβ
R4
C1

FUEL PRESSURE [MPa]
(+)
Pbase
La
P1
Lc
Ld
Lb
P5
Pe
ΔP
Pd
P2
P3
TIME [μsec]

Td
Te
(+)
0
TH1
TH2
DIFFERENTIATION VALUE
(-)
TIME [μsec]

FUEL-INJECTION CONDITION DETECTOR

CROSS-REFERENCE TO RELATED APPLICATION

This application is based on Japanese Patent Application No. 2010-209100 filed on Sep. 17, 2010, the disclosure of which is incorporated herein by reference.

FIELD OF THE INVENTION

The present invention relates to a fuel-injection condition detector which detects a variation in fuel pressure due to a fuel injection through a fuel injector provided to an internal combustion engine, and then estimates a fuel-injection condition, such as a fuel-injection-start timing and a fuel-injection-end timing, based on a pressure waveform detected by a fuel pressure sensor.

BACKGROUND OF THE INVENTION

JP-2009-97385A shows a fuel-injection condition detector which detects a variation in fuel pressure due to a fuel injection by means of a fuel pressure sensor, and then estimates a fuel-injection condition, such as a fuel-injection-start timing and a fuel-injection-end timing, based on a pressure waveform detected by a fuel pressure sensor. The present applicant proposes a specific method for estimating the fuel-injection condition from the pressure waveform in Japanese patent application No. 2009-074283, which has not been published yet at the time when the present application is filed.

As shown in FIG. 2C, on the pressure waveform of which pressure value is decreasing (descent pressure waveform), a point "Pd" is obtained. At the point "Pd", its differentiation value is minimum. Then, a tangential line at the point "Pd" is computed as an approximate straight line "La" of the descent pressure waveform. A reference straight line "Lc" is defined based on a pressure "Phase" of before a fuel injection. An intersection of the line "Lc" and the line "La" is computed as a pressure changing point "P1". A timing which is earlier than the pressure changing point "P1" by a specified time "C1" is computed as a fuel-injection-start timing "R1" as shown in FIG. 2B.

A fuel-injection-end timing "R4" is also computed in a similar way. That is, on the pressure waveform of which pressure value is increasing (ascent pressure waveform), a point "Pe" is obtained. At the point "Pe", its differentiation value is maximum. A tangential line at the point "Pe" is computed as an approximate straight line "Lb" of the ascent pressure waveform. Another reference straight line "Ld" is defined based on a pressure "Phase" of before a fuel injection. An intersection of the line "Lb" and the line "Ld" is computed. A timing which is earlier than the intersection by a specified time is computed as a fuel-injection-end timing "R4".

However, in a case that the fuel-injection-start timing "R1" is computed based on the tangential line "La", if the point "Pd" slightly deviates from an actual value as denoted by "Td" in FIGS. 2C and 2D, the computed fuel-injection-start timing largely deviates from the actual fuel-injection-start timing. Therefore, it is difficult to compute the fuel-injection-start timing "R1" with high accuracy. Also in a case that the fuel-injection-end timing "R4" is computed, if the point "Pe" slightly deviates from the actual value, the computed fuel-injection-end timing largely deviates from the actual fuel-injection-end timing. Thus, it is difficult to compute the fuel-injection-end timing "R4" with high accuracy.

A maximum fuel-injection-rate timing "R2" and the fuel injection quantity can be computed based on the lines "La" and "Lb". However, also in this case, since the lines "La" and "Lb" may deviate, it is difficult to compute the fuel-injection condition with high accuracy.

SUMMARY OF THE INVENTION

The present invention is made in view of the above matters, and it is an object of the present invention to provide a fuel-injection condition detector which enables to estimate an actual fuel-injection condition with high accuracy.

According to the present invention, a fuel-injection condition detector is applied to a fuel injection system in which a fuel injector injects a fuel accumulated in an accumulator. The fuel-injection condition detector includes: a fuel pressure sensor detecting a fuel pressure in a fuel supply passage from the accumulator to an injection port of the fuel injector; and an approximating means for approximating a descent pressure waveform or an ascent pressure waveform to a straight line.

The descent pressure waveform and the ascent pressure waveform are a part of a pressure waveform detected by the fuel pressure sensor. The descent pressure waveform represents a decreasing fuel pressure due to an opening of the injection port. The ascent pressure waveform represents an increasing fuel pressure due to a closing of the injection port.

The fuel-injection condition detector further includes an injection condition estimating means for estimating a fuel-injection condition based on the straight line approximated by the approximating means.

The approximating means includes: a first approximate means for approximating a plurality of fuel pressure values representing the descent pressure waveform or the ascent pressure waveform into a least-squares approximate line by least-squares method; a weighting means for applying a weight to the fuel pressure value, and a second approximate means for approximating the fuel pressure value having the weight into a weighted approximate line by the least-squares method. The weight is set greater as a difference between the fuel pressure and the least-squares approximate line is larger;

Since the descent pressure waveform or the ascent pressure waveform is approximated into a straight line by least-squares method, it can be avoided that the accuracy of the approximated straight line is deteriorated due to a deviation of the minimum differentiation value point "Pd" or the maximum differentiation value point "Pe" from an actual point. Furthermore, since the fuel-injection condition detector of the present invention includes the weighting means and the second approximate means, an approximated straight line having a high correlation with the fuel injection rate can be obtained and the fuel-injection condition can be estimated with high accuracy.

In FIG. 5A, a tangential line "La0" at a minimum differentiation value point "Pd" on the descent pressure waveform has a high correlation with the injection-rate waveform. Thus, it is preferable that this tangential line "La0" is computed as the approximate straight line. However, if the minimum differentiation value point "Pd" is computed to obtain a tangential line thereon, it is likely that the line is largely deviate from the tangential line "La0" as shown by dot-dash-lines "X1" and "X2". Besides, at a vicinity of the values "Da" and "Db", the slopes of their tangential lines are greater than that of the tangential line "La0" Thus, if the pressure values are approximated to the straight line "La1", its slope is greater than that of the desired tangential line "La0".

As shown in FIG. 5A, at the vicinity of the pressure values "Da" and "Db", a difference between the pressure value and the straight line "La1" is large. By correcting the straight line "La1" in such a manner as to decrease the difference as shown by arrows "Y1" and "Y2", the slope of the straight line "La1" comes close to the slope of the tangential line "La0".

With respect to the ascent pressure waveform, the approximate straight line "Lb1" is corrected so that the slope of the straight line "Lb1" comes close to the slope of the tangential line "Lb0" at the maximum differentiation value point "Pe".

In view of the above, the pressure values are weighted according to a difference between the fuel pressure value and the least-squares approximate line "La1", "Lb1". The weight is set greater as the difference is larger. The weighted fuel pressure value is approximated to a weighted approximate line by the least-squares method again. The slopes of the weighted approximate lines "La2" and "Lb2" come close to those of the tangential lines "La0" and "Lb0".

As described above, according to the present invention, the weighted approximate line "La2", "Lb2" can be obtained, which has high correlation with the injection-rate waveform. Thus, the fuel-injection condition can be estimated with high accuracy.

According to another aspect of the present invention, a fuel-injection condition detector includes: a fuel pressure sensor detecting a fuel pressure in a fuel supply passage; an approximating means for approximating a descent pressure waveform or an ascent pressure waveform to a straight line; and an injection condition estimating means for estimating a fuel-injection condition based on the straight line approximated by the approximating means.

The approximating means includes a computing means for computing a minimum differentiation value point at which a slope of the descent pressure waveform is minimum, or for computing a maximum differentiation value point at which a slope of the ascent pressure waveform is maximum, a weighting means for applying a weight to the fuel pressure value, and a weighted approximate means for approximating the fuel pressure value having the weight into a weighted approximate line by the least-squares method. The weight is set greater as the fuel pressure is more close to the minimum differentiation value point or the maximum differentiation value point;

Since the descent pressure waveform or the ascent pressure waveform is approximated into a straight line by least-squares method, it can be avoided that the accuracy of the approximated straight line is deteriorated due to a deviation of the minimum differentiation value point "Pd" or the maximum differentiation value point "Pe" from an actual point. Furthermore, since the fuel-injection condition detector of the present invention includes the weighting means and the weighted approximate means, an approximated straight line having a high correlation with the fuel injection rate can be obtained and the fuel-injection condition can be estimated with high accuracy.

As described referring to FIG. 5A, it is preferable that the tangential line "La0" at the minimum differentiation value point on the descent pressure waveform is computed as the approximate straight line. In a case that the pressure values are approximated to the straight line "La1", its slope is greater than that of the desired tangential line "La0".

In view of the above, the pressure values are weighted in such a manner that the weight is set greater as the pressure value is more close to the minimum differentiation value point "Pd". The weighted fuel pressure value is approximated to a weighted approximate line by the least-squares method. As the result, the slope of the straight line "La1" is corrected in such a manner as to come close to the slope of the tangential line "La0" at the maximum differentiation value point "Pe".

In a case that the ascent pressure waveform is approximated, the pressure values are weighted and these weighted pressure values are approximated to a weighted approximate line by the least-squares method. As the result, the slope of the straight line "Lb1" is corrected in such a manner as to come close to the slope of the tangential line "Lb0 (not shown)".

As described above, also according to another aspect of the present invention, the weighted approximate line can be obtained, which has high correlation with the injection-rate waveform. Thus, the fuel-injection condition can be estimated with high accuracy.

BRIEF DESCRIPTION OF THE DRAWINGS

Other objects, features and advantages of the present invention will become more apparent from the following description made with reference to the accompanying drawings, in which like parts are designated by like reference numbers and in which:

FIGS. 5A and 5B are charts showing a least-square straight line "La1", a tangential line "La0" at the minimum differentiation value point "Pd" and the like;

DETAILED DESCRIPTION OF EMBODIMENTS

Hereinafter, embodiments of a fuel-injection condition detector according to the present invention will be described. A fuel-injection condition detector is applied to an internal combustion engine (diesel engine) having four cylinders #1-#4.

First Embodiment

Figure 1:
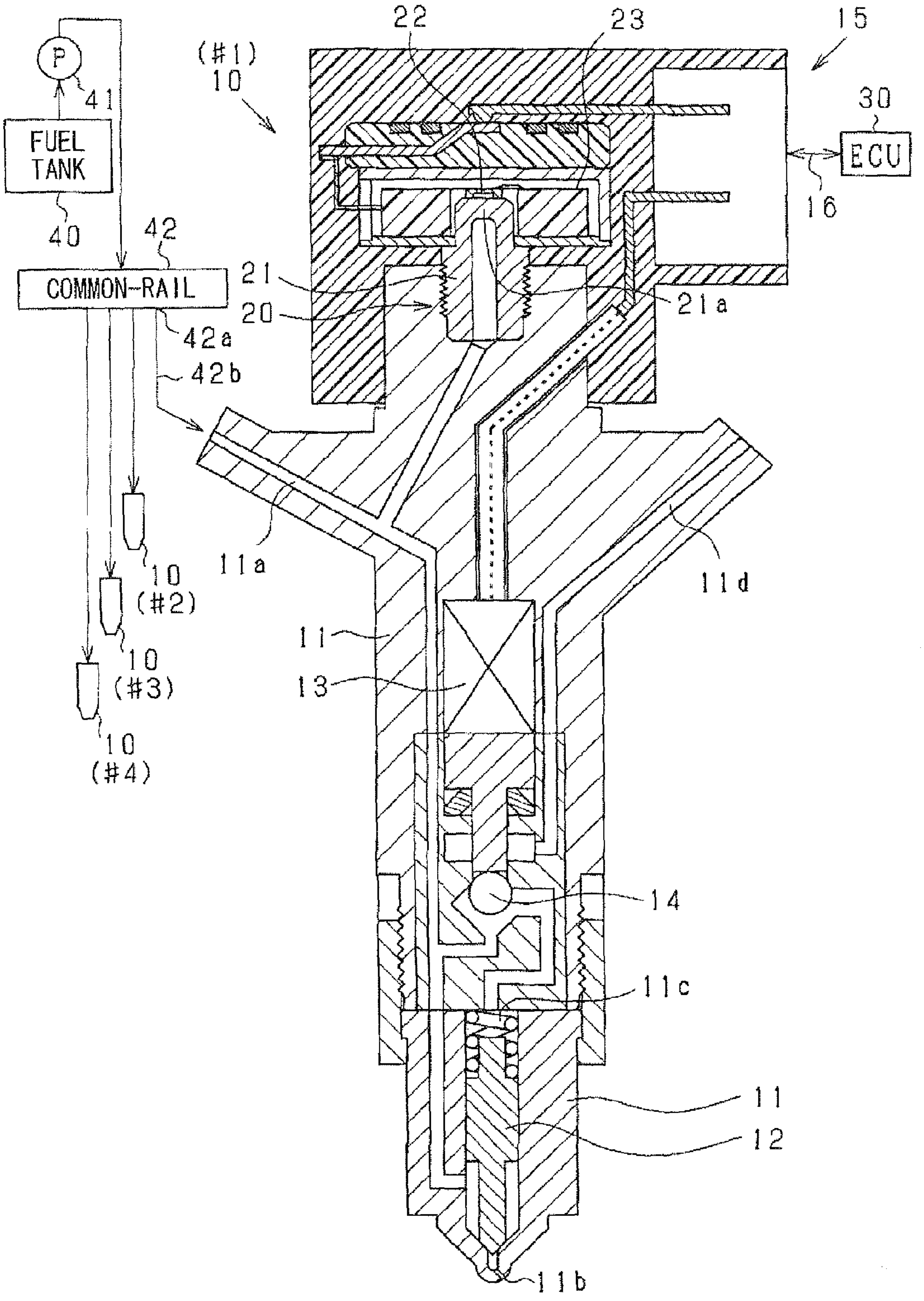
FIG. 1 is a construction diagram showing an outline of a fuel injection system on which a fuel-injection condition detector is mounted, according to a first embodiment of the present invention.

FIG. 1 is a schematic view showing fuel injectors 10 provided to each cylinder, a fuel pressure sensor 20 provided to each fuel injectors 10, an electronic control unit (ECU) 30 and the like.

First, a fuel injection system of the engine including the fuel injector 10 will be explained. A fuel in a fuel tank 40 is pumped up by a high-pressure pump 41 and is accumulated in a common-rail (accumulator) 42 to be supplied to each fuel injector 10 (#1-#4). The fuel injectors 10 (#1-#4) perform fuel injection sequentially in a predetermined order. The high-pressure pump 41 is a plunger pump which intermittently discharges high-pressure fuel.

The fuel injector 10 is comprised of a body 11, a needle valve body 12, an actuator 13 and the like. The body 11 defines a high-pressure passage 11*a* and an injection port 11*b*. The needle valve body 12 is accommodated in the body 11 to open/close the injection port 11*b*.

The body 11 defines a backpressure chamber 11*c* with which the high pressure passage 11*a* and a low pressure passage 11*d* communicate. A control valve 14 switches between the high pressure passage 11*a* and the low pressure passage 11*d*, so that the high pressure passage 11*a* communicates with the backpressure chamber 11*c* or the low pressure passage 11*d* communicates with the backpressure chamber 11*c*. When the actuator 13 is energized and the control valve 14 moves downward in FIG. 1, the backpressure chamber 11*c* communicates with the low pressure passage 11*d*, so that the fuel pressure in the backpressure chamber 11*c* is decreased. Consequently, the back pressure applied to the valve body 12 is decreased so that the valve body 12 is opened. Meanwhile, when the actuator 13 is deenergized and the control valve 14 moves upward, the backpressure chamber 11*c* communicates with the high pressure passage 11*a*, so the fuel pressure in the backpressure chamber 11*c* is increased. Consequently, the back pressure applied to the valve body 12 is increased so that the valve body 12 is closed.

The ECU 30 controls the actuator 13 to drive the valve body 12. When the needle valve body 12 opens the injection port 11*b*, high-pressure fuel in the high pressure passage 11*a* is injected to a combustion chamber (not shown) of the engine through the injection port 11*b*. The ECU 30 has a microcomputer which computes a target fuel-injection condition, such as a fuel-injection-start timing, a fuel-injection-end timing, a fuel injection quantity and the like based on an engine speed, an engine load and the like. The ECU 30 transmits a fuel-injection-command signal to the actuator 13 in order to drive the needle valve body 12 in such a manner as to obtain the above target fuel-injection condition.

Figures 2A, 2B, 2C, 2D:
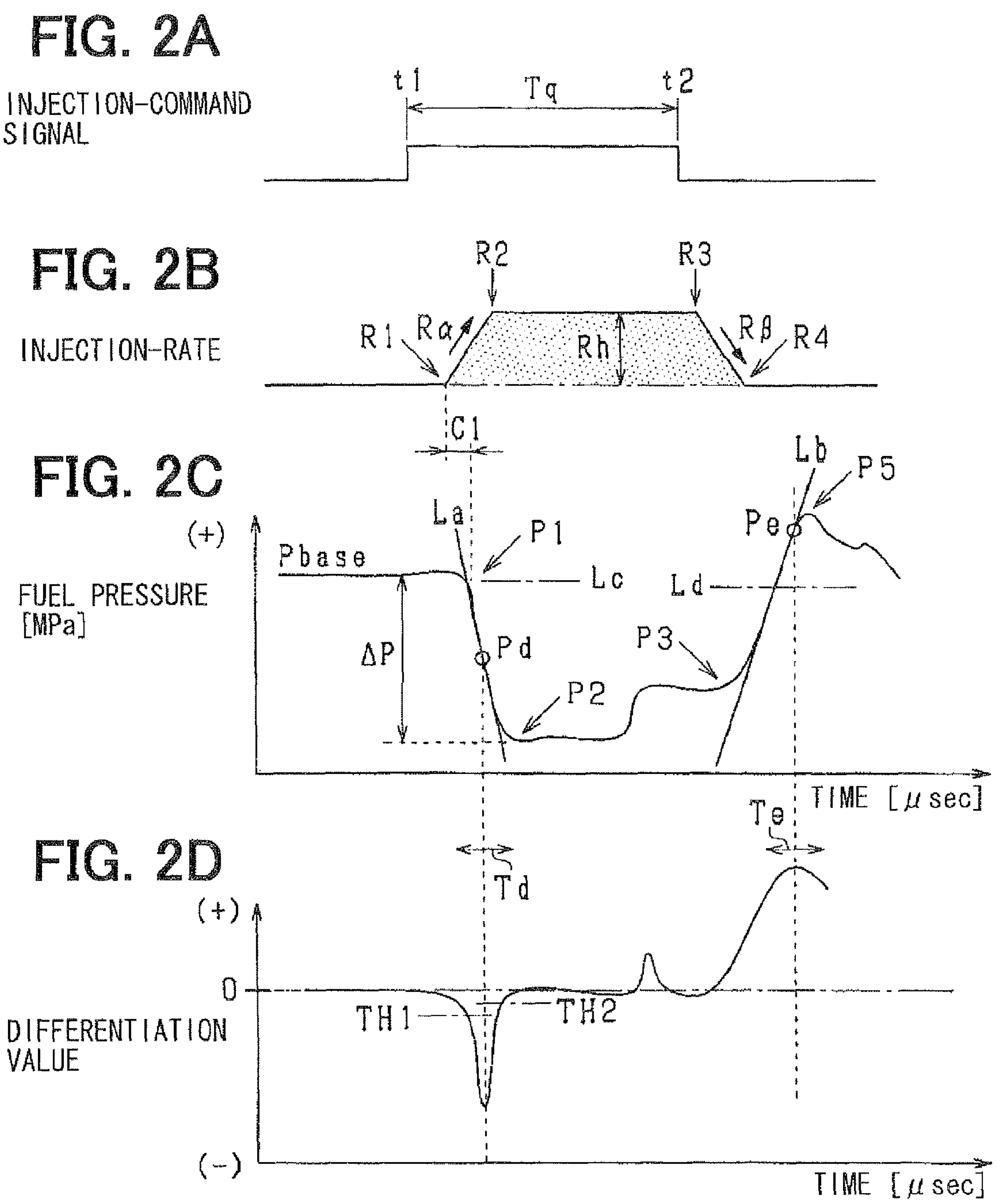
FIG. 2A is a chart showing a fuel-injection-command signal to a fuel injector.
FIG. 2B is a chart showing an injection-rate waveform indicative of a variation in fuel injection rate.
FIG. 2C is a chart showing a pressure waveform detected by a fuel pressure sensor.
FIG. 2D is a chart showing a differentiation value of the pressure waveform.

The ECU 30 has a microcomputer which computes the target fuel-injection condition based on the engine load and the engine speed, which are derived from an accelerator position. For example, the microcomputer stores an optimum fuel-injection condition (number of fuel injections, fuel-injection-start timing, fuel-injection-end timing, fuel injection quantity and the like) with respect to the engine load and the engine speed as a fuel-injection condition map. Then, based on the current engine load and engine speed, the target fuel-injection condition is computed in view of the fuel-injection condition map. Then, based on the computed target fuel-injection condition, the fuel-injection-command signal represented by "t1", "t2", "Tq" is established as shown in FIG. 2A. For example, the fuel-injection-command signal corresponding to the target fuel-injection condition is stored in a command map. Based on the computed target fuel-injection condition, the fuel-injection-command signal is established in view of the command map. As above, according to the engine load and the engine speed, the fuel-injection-command signal is established to be output from the ECU 30 to the injector 10.

It should be noted that the actual fuel-injection condition varies relative to the fuel-injection-command signal due to aging deterioration of the fuel injector 10, such as abrasion of the injection port 11*b*. Thus, the injection-rate waveform is computed based on the pressure waveform detected by the fuel pressure sensor 20, so that the fuel-injection condition is detected. A correlation between the detected fuel-injection condition and the fuel-injection-command signal (pulse-on timing t1, pulse-off timing t2, and pulse-on period Tq) is learned. Based on this learning result, the fuel-injection-command signal stored in the command map is corrected. Thus, the fuel-injection condition can be accurately controlled so that the actual fuel-injection condition agrees with the target fuel-injection condition.

A structure of the fuel pressure sensor 20 will be described hereinafter. The fuel pressure sensor 20 includes a stem 21 (load cell), a pressure sensor element 22 and a molded IC 23. The stem 21 is provided to the body 11. The stem 21 has a diaphragm 21*a* which elastically deforms in response to high fuel pressure in the high-pressure passage 11*a*. The pressure sensor element 22 is disposed on the diaphragm 21*a* to output a pressure detection signal depending on an elastic deformation of the diaphragm 21*a*.

The molded IC 23 includes an amplifier circuit which amplifies a pressure detection signal transmitted from the pressure sensor element 22 and includes a transmitting circuit which transmits the pressure detection signal. A connector 15 is provided on the body 11. The molded IC 23, the actuator 13 and the ECU 30 are electrically connected to each other through a harness 16 connected to the connector 15. The amplified pressure detection signal is transmitted to the ECU 30. Such a signal communication processing is executed with respect to each cylinder.

When the fuel injection is started, the fuel pressure in the high-pressure passage 11*a* starts to decrease. When the fuel injection is terminated, the fuel pressure in the high-pressure passage 11*a* starts to increase. That is, a variation in the fuel pressure and a variation in the injection rate have a correlation, so that the variation in the injection rate (actual fuel-injection condition) can be detected from the variation in the fuel pressure. The fuel-injection-command signal is corrected so that the detected actual fuel-injection condition agrees with the target fuel-injection condition. Thereby, the fuel-injection condition can be controlled with high accuracy.

Referring to FIGS. 2A to 2C, a correlation between the pressure waveform detected by the fuel pressure sensor 20 and the injection-rate waveform will be explained, hereinafter.

FIG. 2A shows a fuel-injection-command signal which the ECU 30 outputs to the actuator 13. Based on this fuel-injection-command signal, the actuator 13 operates to open the injection port 11*b*. That is, a fuel injection is started at a pulse-on timing "t1" of the injection-command signal, and the fuel injection is terminated at a pulse-off timing "t2" of the injection-command signal. During a time period "Tq" from the timing 11" to the timing "t2", the injection port 11*b* is opened. By controlling the time period "Tq", the fuel injection quantity "Q" is controlled.

FIG. 2B shows an injection-rate waveform representing a variation in fuel injection rate, and FIG. 2C shows a pressure waveform representing a variation in detection pressure detected by the fuel pressure sensor 20. FIG. 2D shows a differentiation value of the pressure waveform.

Since the pressure waveform and the injection-rate waveform have a correlation which will be described below, the injection-rate waveform can be estimated from the detected pressure waveform. That is, as shown in FIG. 2A, after the injection command signal rises at the timing "t1", the fuel injection is started and the injection rate starts to increase at a timing "R1". When a delay time "C1" has elapsed after the timing "R1", the detection pressure starts to decrease at a point "P1". Then, when the injection rate reaches the maximum injection rate at a timing "R2", the detection pressure drop is stopped at a point "P2". Then, when a delay time has passed after the injection rate starts to decrease at the timing "R3", the detection pressure starts to increase at the point "P3". After that, when the injection rate becomes zero and the actual fuel injection is terminated at a timing “R4”, the increase in the detection pressure is stopped at the point “P5”.

As explained above, the pressure waveform and the injection-rate waveform has a high correlation. Since the injection-rate waveform represents the fuel-injection-start timing “R1”, the fuel-injection-end timing “R4” and the fuel injection quantity (area of shade portion in FIG. 2B), the fuel injection condition can be detected by estimating the injection-rate waveform from the pressure waveform.

Figure 3:
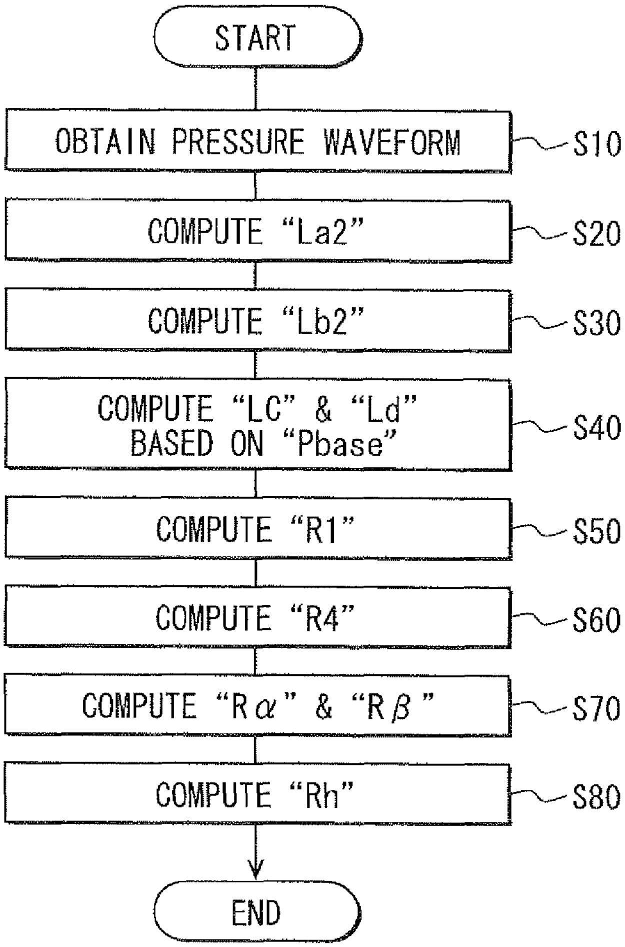
FIG. 3 is a flowchart showing a processing for estimating an injection-rate waveform from a fuel pressure waveform.

Referring to FIG. 3, a processing for estimating the injection-rate waveform from the pressure waveform will be described hereinafter. This processing shown in FIG. 3 is executed by a microcomputer of the ECU 30 every when one fuel injection is performed.

In step S10, a plurality of detection values which the fuel pressure sensor 20 outputs during a single fuel injection period are obtained. That is, a pressure waveform is obtained. In step S20 (approximating means), the computer computes an approximate straight line “La2” which approximates a descent pressure waveform (P1-P2). In step S30, the computer computes an approximate straight line “Lb2” which approximates an ascent pressure waveform (P3-P5). A specific computation method of the lines “La2” and “Lb2” will be described later.

In step S40, the computer computes reference straight lines “Lc” and “Ld” in view of the reference pressure “Pbase”. The reference pressure “Pbase” is an average pressure from the timing of “t1” to the timing of “P1”. The reference straight line “Lc” is computed based on the reference pressure “Pbase”. The reference straight line “Ld” is computed based on a pressure which is lower than the reference pressure “Pbase” by a specified value. This specified value is set larger as a pressure drop ΔP from “P1” to “P2” is larger or the fuel injection command period “Tq” is longer.

In step S50, an intersection of the reference line “Lc” and the approximate straight line “La2” is computed. A timing of this intersection is substantially the same as a timing of the point “P1”. Since the timing of the intersection has a high correlationship with the fuel-injection-start timing “R1”, the fuel-injection-start timing “R1” is computed based on the intersection. In step S60, an intersection of the reference line “Ld” and the approximate straight line “Lb2” is computed. Since the timing of this intersection has a high correlationship with the fuel-injection-end timing “R4”, the fuel-injection-end timing “R4” is computed based on the intersection.

A slope “Rα” of the injection-rate shown in FIG. 2B has high correlationship with a slope of the approximate straight line “La2”. In view of this, in step S70, the slope “Rα” of the injection-rate is computed based on the slope of the approximate straight line “La2”. Also, a slope “Rβ” of the injection-rate shown in FIG. 2B has high correlationship with a slope of the approximate straight line “Lb2”. In view of this, the slope “Rβ” of the injection-rate is computed based on the slope of the approximate straight line “Lb2”. The pressure drop ΔP from “P1” to “P2” has a high correlationship with a maximum fuel injection rate “Rh”. In view of this, in step S80, the maximum fuel injection rate “Rh” is computed based on the pressure drop ΔP.

As described above, in steps S50-S80 (injection condition estimating means), the fuel-injection-start timing “R1”, the fuel-injection-end timing “R4”, the slope “Rα” of the injection-rate increase, the slope “Rβ” of the injection-rate decrease, and the maximum injection rate “Rh” are computed. Based on these, the injection-rate waveform shown in FIG. 2B is estimated.

Figure 4:
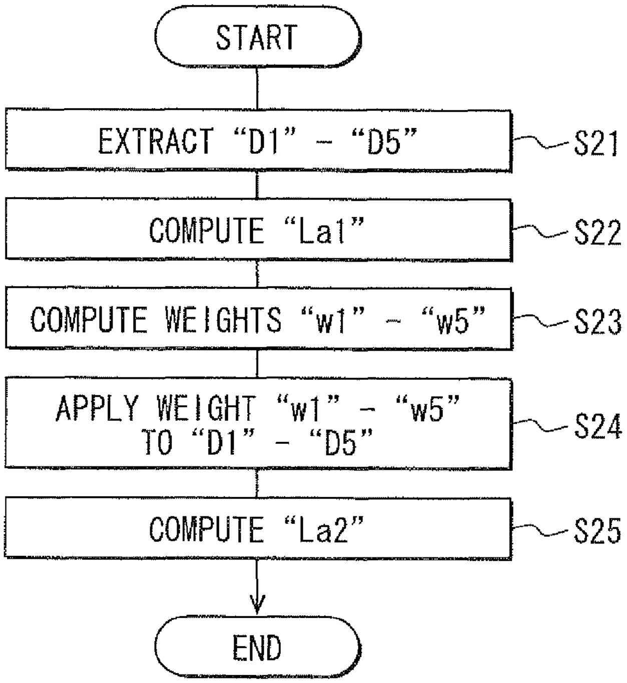
FIG. 4 is a flowchart showing a subroutine of FIG. 3 for computing a weighted approximate line "La2"
Figure 5A:
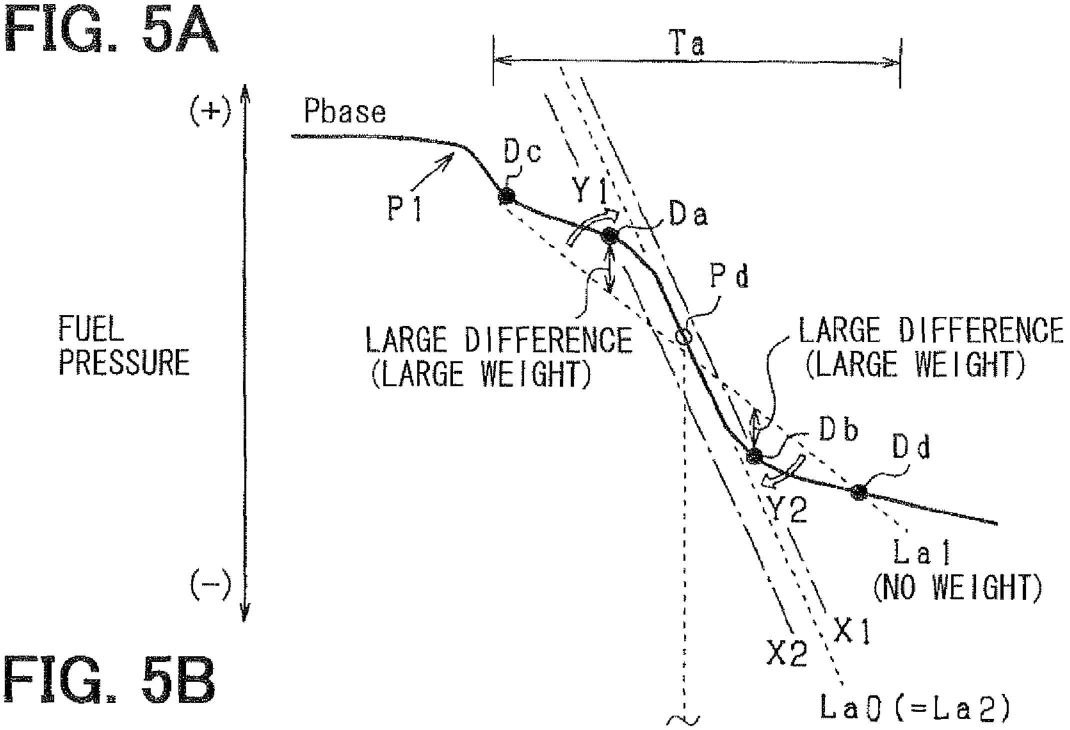

FIG. 4 is a flowchart showing a processing for computing the approximate straight line “La2” from the descent pressure waveform, which is a subroutine of step S20 in FIG. 3. In FIG. 5A, a solid line indicates a descent pressure waveform.

Figure 6:
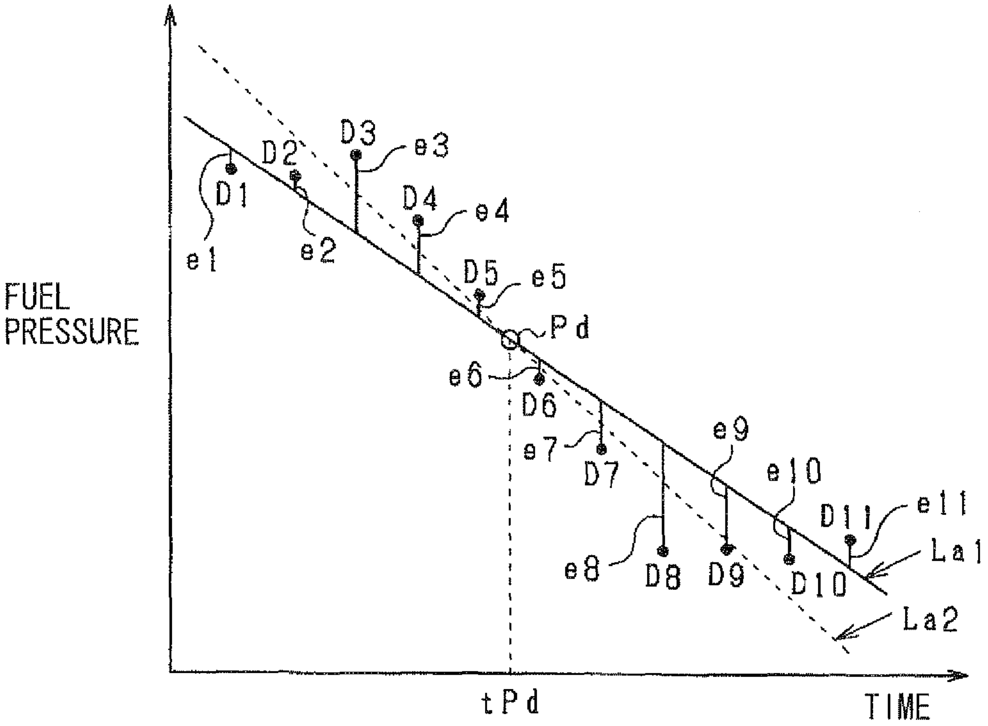
FIG. 6 is a graph schematically showing a weighted approximate line "La2"

In step S21, a descent pressure waveform is extracted from the fuel pressure waveform. Specifically, as shown in FIG. 5A, the pressure values of the pressure waveform corresponding to an approximate range “Ta” are extracted. FIG. 6 is a graph schematically showing a plurality of extracted pressure values “D1”-“D11”. The vertical axis of FIG. 6 represents a fuel pressure (detection value). The horizontal axis of FIG. 6 represents an elapsed time. The pressure values “D1”-“D11” are detected at specified sampling intervals.

A start point of the approximate range “Ta” is established at a timing when a specified time (injection delay time) has elapsed after the injection command signal IV. An end point of the approximate range “Ta” is established at a timing when a specified period required for a valve 12 to be lifted up has elapsed after the start point. Alternatively, a differentiation value of the pressure waveform is computed as shown in FIG. 2D. When the differentiation value becomes lower than a first threshold “TH1” first after the injection command signal “t1” is outputted, the start point of the approximate range “Ta” is established. Then, when the differentiation value becomes larger than a second threshold “TH2”, the end point of the approximate range “Ta” is established.

Figure 5B:
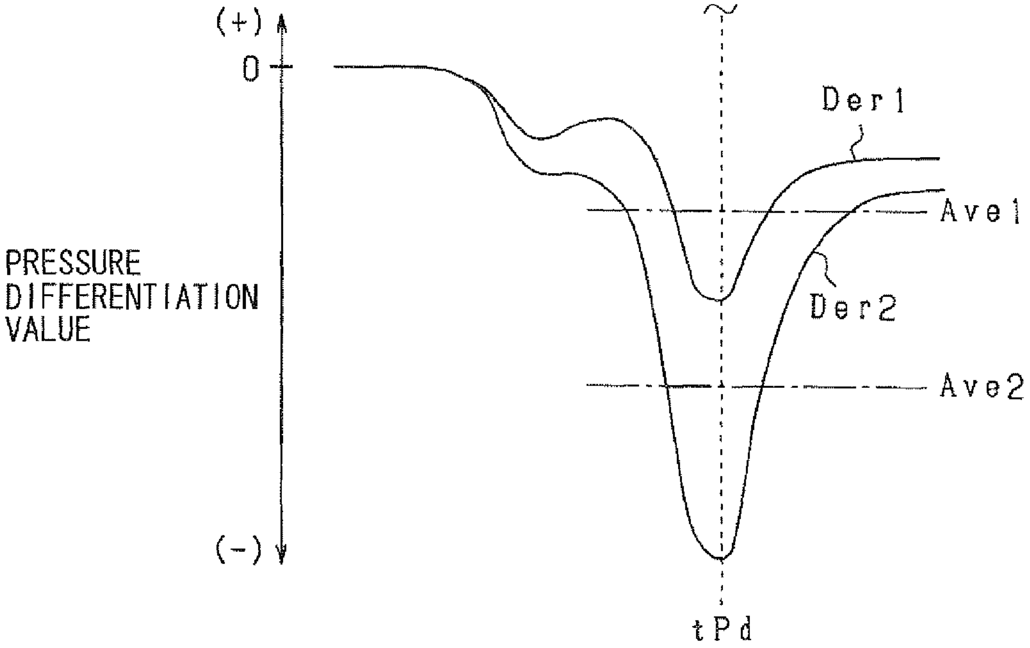

In step S22 (first approximate means), the extracted pressure values “D1”-“D11” are approximated to a least-squares approximate line “La1” by least squares method. A dotted line in FIG. 5A and a solid line in FIG. 6 correspond to the least-squares approximate line “La1”. In FIG. 5B, a waveform “Der1” represents a variation in the differentiation value of the pressure waveform. The slope of the straight line “La1” computed in step S22 corresponds to an average “Ave1” of the differentiation values “Der1” in the approximate range “Ta”. In other word, an average of the slope of a tangential line of the descent pressure waveform corresponds to the average “Ave1” of the differentiation values “Der1”.

In step S23 (weighting means), with respect to each value “D1”-“D11”, weights “w1”-“w11” are computed according to distances (differences “e1”-“e11”) between each value and the least-squares approximate line “La1”. Specifically, as the difference “e1”-“e11” is larger, the weight “w1”-“W11” is set larger. The difference “e1”-“e11” is proportional to the weight “w1”-“w11”. In step S24 (weighting means), the computed weights “w1”-“w11” are respectively applied to the values “D1”-“D11”. Specifically, each of values “D1”-“D” is multiplied by each of weights “w1”-“w11” to compute weighted values “Dw1”-“Dw11”. Thus, in an example shown in FIG. 6, with respect to values “D3” and “D8” of which differences “e3” and “e8” are relatively large, the values “D3” and “D8” are weighted in such a manner that the difference relative to the least-squares approximate line “La1” becomes further large.

In step S25 (second approximate means), the weighted values “Dw1”-“Dw11” are approximated to a weighted approximate line “La2” by least-squares method. In FIG. 6, the weighted approximate line “La2” is represented by a dotted line.

As above, by correcting the line “La1” into the line “La2”, the solid line is corrected to the dotted line in FIG. 6. The differences between the values “D3”, “D8” and the line “La2” are decreased. In FIG. 5A, the line “La1” is corrected in such a manner as to come close to the values “Da” and “Db”. Consequently, the line “La1” is corrected as shown by arrows “Y1” and “Y2”.

Meanwhile, among the pressure values “D1”, “D2”, “D5”, “D6”, “D10” and “D11” in FIG. 6, although the differences between the values “D1”, “D2”, “D10”, “D11” and the weighted approximate line "La2" are increased, the differences between the values "D5", "D6" and the line "La2" are decreased. The pressure values "D1", "D2", "D10", "D11" are positioned far from a minimum differentiation value point "Pd", and the pressure values "D5", "D6" are positioned close to the point "Pd". In FIG. 5A, the line "La1" does not move apart from a vicinity of the point "Pd", but move apart from the pressure values "Dc" and "Dd".

In FIG. 5B, a waveform "Der2" represents a variation in the differentiation value of the waveform which is illustrated by the weighted values "Dw1"-"Dw11". The slope of the straight line "La2" computed in step S25 corresponds to an average "Ave2" of the differentiation values "Der2" in the approximate range "Ta". In other word, an average of the slopes of the tangential lines on the waveforms represented by the weighted values "Dw1"-"Dw11" corresponds to the average "Ave2" of the differentiation values "Der2". The average "Ave2" of the differentiation values "De2" is smaller than the average "Ave1" of the differential values "Der1". That is, the slope of the weighted approximate line "La2" is smaller than that of the last-squares straight line "La1".

The slope of the tangential line at the minimum differentiation value point "Pd" on the descent pressure waveform is minimum. The slopes of pressure waveform between the values "Da" and "Dc" and between the values "Db" and "Dd" are relatively large. Thus, the slope of the line "La1" is larger than that of the tangential line at the point "Pd". Meanwhile, since the slope of the weighted approximate line "La2" is corrected as described above, the slope of the line "La2" comes close to the slope of the tangential line "La0" at the point "Pd".

A subroutine of step S30 in FIG. 3 is also executed in the same way of the processing in step S20. That is, the pressure values are extracted from the ascent pressure waveform and these pressure values are approximated to a least-squares approximate line "Lb1" by the least squares method (first approximate means). Then, with respect to each pressure value, the weights are computed and applied to each pressure value. Then, the weighted values are approximated into a weighted approximate line "La2" (second approximate means).

The weighted approximate line "La2" comes close to a tangential line "Lb0" at the point "Pd". The slope of the least-squares approximate line "Lb1" is smaller than that of the tangential line "Lb0". Meanwhile, since the slope of the weighted approximate line "Lb2" is corrected so as to be larger than that of the line "Lb1", the line "Lb2 comes close to the tangential line "Lb0" more than the line "Lb1".

As described above, according to the present embodiment, the least-squares approximate line "La1" is corrected to the weighted approximate line "La2". The weighted approximate line "La2" is close to the tangential line "La0" at the point "Pd". With respect to the ascent pressure waveform, the weighted approximate line "Lb2" can be computed, which is close to the tangential line "Lb0". Since the fuel-injection-start timing "R1", the fuel-injection-end timing "R4", the slope "Rα", and the slope "Rβ" are computed by means of the approximate lines "La2" and "Lb2" of the descent pressure waveform and the ascent pressure waveform, the fuel injection rate waveform (fuel injection condition9 can be estimated with high accuracy.

Second Embodiment

In the above first embodiment, the weights "w1"-"w11" are computed based on the differences "e1"-"e11" in step S23. According to the second embodiment, the weights "w1"-

"w11" are computed based on a time difference between a detection timing of each pressure value "D1"-"D11" and an appearance timing "tPd" of the point "Pd". In FIG. 6, the weights of the values "D5" and "D6" are greater than those of values "D1", "D2", "D10" and "D11". In FIG. 5A, the weights of the values "Da" and "Db" are greater than those of the values "Dc" and "Dd".

Figure 7:
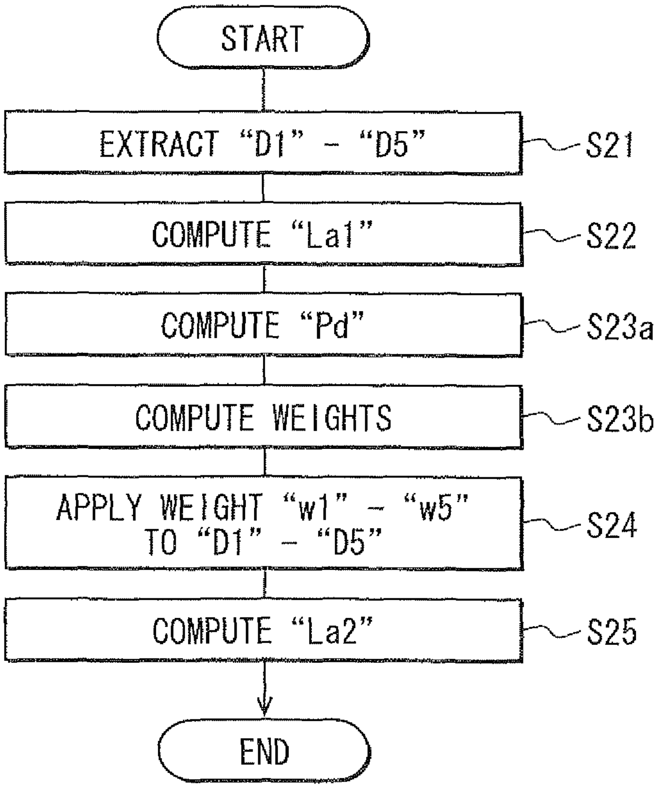
FIG. 7 is a flowchart showing a processing for computing a weighted approximate line.

FIG. 7 is a flowchart showing a processing for computing an approximated line of a descent pressure waveform. In step S21 and step S22, the pressure values "D1"-"D11" of the descent pressure waveform are approximated to a least-squares approximate line "La1" by least squares method.

In step S23*a* (weighting means), the appearance timing "tPd" of the point "Pd" is computed. In step S23*b* (weighting means), with respect to each value "D1"-"D11", the weights "w1"-"w11" are computed according to the time differences between the detection timings of the pressure values "D1"-"D11" and the appearance timing "tPd". Specifically, as the time difference is smaller, the weight "w1"-"W11" is set larger. The time difference is inversely proportional to the weight "w1"-"w11".

In step S24 (weighting means), the weights "w1"-"w11" computed in step S23*b* are respectively applied to the values "D1"-"D11". Specifically, each of values "D1"-"D11" is multiplied by each of weights "w1"-"w11" to compute weighted values "Dw1"-"Dw11".

In step S25 (weighted approximate means), the weighted values "Dw1"-"Dw11" are approximated to a weighted approximate line "La2" by least-squares method.

As above, the least-squares approximate line "La1" is corrected to the weighted approximate line "La2". The straight line "La1" is corrected to come close to the tangential line "LAO" as shown by the arrows "Y1" and "Y2" in FIG. 5A.

Also, the ascent pressure waveform is approximated to a straight line in the same manner as the processing shown in FIG. 7. That is, the pressure values of the ascent pressure waveform are approximated to a least-squares approximate line "Lb1" by least squares method. Then, the appearance timing "tPe" of the maximum differentiation value point "Pe" on the ascent pressure waveform is computed. Then, each of the pressure values is weighted. These weighted values are approximated into a weighted approximate line. As above, the least-squares approximate line "La1" is corrected to the weighted approximate line "La2". The line "La1" is corrected to come close to the tangential line "Lb0".

Also in the second embodiment, with respect to the descent pressure waveform, the approximate line can be computed, which is close to the tangential line "La0" at the point "Pd". With respect to the ascent pressure waveform, the approximate line can be computed, which is close to the tangential line "Lb0" at the point "Pe". Since the fuel-injection-start timing "R1", the fuel-injection-end timing "R4", the slope "Rα", and the slope "Rβ" are computed by means of the approximate lines of the descent pressure waveform and the ascent pressure waveform, the fuel injection rate waveform (fuel injection condition) can be estimated with high accuracy.

Other Embodiment

The present invention is not limited to the embodiments described above, but may be performed, for example, in the following manner. Further, the characteristic configuration of each embodiment can be combined.

The fuel pressure sensor 20 can be arranged at any place in a fuel supply passage between an outlet 42*a* of the common-rail 42 and the injection port 11*b*. For example, the fuel pressure sensor 20 can be arranged in a high-pressure pipe 42*b* connecting the common-rail 42 and the fuel injector 10. The high-pressure pipe 42*b* and the high-pressure passage 11*a* in the body 11 correspond to a fuel supply passage of the present invention.

In the first embodiment, the weights may be varied according to parameters, such as fuel temperature and fuel property, even if the difference is equal.

Also in the second embodiment, the weights may be varied according to parameters, such as fuel temperature and fuel property, even if the time difference is equal.

What is claimed is:

1. A fuel-injection condition detector applied to a fuel injection system in which a fuel injector injects a fuel accumulated in an accumulator, the fuel-injection condition detector comprising:

a fuel pressure sensor detecting a fuel pressure in a fuel supply passage from the accumulator to an injection port of the fuel injector, the fuel pressure sensor generating a pressure waveform comprising a plurality of fuel pressure values;

an approximate means for approximating a descent pressure waveform or an ascent pressure waveform to a straight line, the descent pressure waveform and the ascent pressure waveform consisting of fuel pressure actual values being a part of a pressure waveform detected by the fuel pressure sensor, the descent pressure waveform representing a decreasing fuel pressure due to an opening of the injection port, the ascent pressure waveform representing an increasing fuel pressure due to a closing of the injection port; and an injection condition estimating means for estimating a fuel-injection condition based on the straight line approximated by the approximate means, wherein the approximate means includes:

a first approximate means for approximating fuel pressure actual values representing the descent pressure waveform or the ascent pressure waveform into a least-squares approximate line by least-squares method;

a weighting means for applying a weight to the fuel pressure actual values, the weight being a coefficient in proportion to a difference of the fuel pressure actual value and the fuel pressure value on the least-square approximate line of a same time on the fuel pressure actual value detected, the weight being set greater as the difference is larger; and a second approximate means for approximating the fuel pressure estimate value having the weight into a least-squares approximate estimate line by the least-squares method.

2. A fuel-injection condition detector applied to a fuel injection system in which a fuel injector injects a fuel accumulated in an accumulator, the fuel-injection condition detector comprising:

a fuel pressure sensor detecting a fuel pressure in a fuel supply passage from the accumulator to an injection port of the fuel injector, the fuel pressure sensor generating a pressure waveform comprising a plurality of fuel pressure values;

an approximate means for approximating a descent pressure waveform or an ascent pressure waveform to a straight line, the descent pressure waveform and the ascent pressure waveform being a part of a pressure waveform consisting of fuel pressure actual values detected by the fuel pressure sensor, the descent pressure waveform representing a decreasing fuel pressure due to an opening of the injection port, the ascent pressure waveform representing an increasing fuel pressure due to a closing of the injection port; and an injection condition estimating means for estimating a fuel-injection condition based on the straight line approximated by the approximating means; wherein the approximate means includes:

a computing means for computing a minimum differentiation value point at which a slope of the descent pressure waveform is minimum, or for computing a maximum differentiation value point at which a slope of the ascent pressure waveform is maximum, a weighting means for applying a weight to the fuel pressure actual values, the weight being a coefficient in proportion to a difference of the fuel pressure actual value and the fuel pressure value on the least-square approximate line of a same time on the fuel pressure actual value detected, the weight being set greater as the fuel pressure value is closer to the minimum differentiation value point or the maximum differentiation value point; and a weighted approximate means for approximating the fuel pressure value having the weight into a least-squares approximate line by the least-squares method.

* * * * *